United States Patent [19]

Tetley et al.

[11] Patent Number: 4,963,730
[45] Date of Patent: Oct. 16, 1990

[54] RADON PROGENY DETECTOR

[75] Inventors: William C. Tetley, Syracuse; Bruce A. Cummings, Baldwinsville; Daniel R. Westcott, North Syracuse, all of N.Y.

[73] Assignee: RAD-X Ltd., Syracuse, N.Y.

[21] Appl. No.: 325,921

[22] Filed: Mar. 20, 1989

[51] Int. Cl.$^5$ .................. G01V 5/00; G01N 21/01
[52] U.S. Cl. ............................. 250/253; 250/432 R
[58] Field of Search ............ 250/253, 255, 432 R, 250/435

[56] References Cited

U.S. PATENT DOCUMENTS

| | | | |
|---|---|---|---|
| 3,614,421 | 10/1971 | Alter et al. | 250/435 |
| 3,665,194 | 5/1972 | Alter et al. | 250/253 |
| 3,922,555 | 12/1975 | Chapuis et al. | 250/472 |
| 4,185,199 | 1/1980 | Droullard et al. | 250/435 |
| 4,385,236 | 5/1983 | Hassib et al. | 250/472.1 |
| 4,518,860 | 5/1985 | Alter et al. | 250/253 |
| 4,704,537 | 11/1987 | Urban et al. | 250/472.1 |
| 4,801,800 | 1/1989 | Scheible | 250/255 |
| 4,847,503 | 7/1989 | Tetley et al. | 250/435 |

FOREIGN PATENT DOCUMENTS 0141553  8/1962  U.S.S.R. ........................ 250/364

Primary Examiner—Constantine Hannaher
Assistant Examiner—J. Eisenberg
Attorney, Agent, or Firm—Wall and Roehrig

[57] ABSTRACT

A radon progeny detector for measuring the concentration of attached and unattached fractions in an atmosphere. A laminar flow of air is drawn sequentially through a diffusion screen and a particle trap. Unattached progeny having a particle size of 10 nm or less are captured upon the mesh of the diffusion screen. Attached progeny pass into the trap where the attached progeny are captured by a filter. Radiation detecting strips for recording radiation from alpha and beta particles emitted by the progeny are mounted on both sides of the diffusion screen and adjacent the particle trap to record the concentrations of both fractions.

14 Claims, 1 Drawing Sheet

RADON PROGENY DETECTOR

BACKGROUND OF THE INVENTION

This invention relates to a device for measuring the concentration of radon progeny in an atmosphere and in particular to a device for measuring unattached radon progeny in an accurate and efficient manner.

Radon is a disintegrating by-product of radium that is oftentimes found trapped within the ground in many geographical locations. As an inert gas, radon has a relatively low chemical interaction rate and, as a result, it can diffuse through soil and thus accumulate within buildings or the like which are situated over areas of high radon concentration. Continual human exposure to certain levels of radon progeny have been shown to be harmful to one's health. The progeny of radon can be divided into two general groups or fractions. The first fraction involves what is referred to as "unattached" progeny wherein airborne progeny is carried along by ultra fine aerosol particles, each having a size of 10 nm or less. The second fraction is referred to as "attached" progeny wherein the progeny are attached to dust particles of 0.01–10 micron size. Progeny attached to dust particles larger than this are considered non-respirable and therefore not significant from a lung cancer standpoint.

Radon progeny generally enters into a home or dwelling through the basement or lower floors where it can accumulate to critical levels. The principal health threat from radon comes from the fine unattached progeny which have greater mobility over its attached counterpart and is more easily deposited on the critical portions of human lungs. The health risk posed by exposure to unattached progeny is further increased in buildings where smokers reside. Similarly, homes having gas ranges, air purifiers and the like, which can significantly alter the aerosol distribution in the atmosphere, and therefore cause a variability in the concentration of unattached progeny fractions and thus increase the uncertainty in the risk factor. It has therefore become extremely important to be able to detect both the presence of attached and unattached progeny fractions in an enclosed structure such as a home so that the risks involved can be accurately assessed.

In U.S. Pat. No. 3,922,555 there is disclosed a portable device for use in uranium mines that is able to detect the presence of alpha particles emitted by two daughters of radon. The device has a hollow housing and a small fan for drawing atmospheric air into the housing. A filter is positioned within the chamber for capturing and retaining progeny particles found in the air flow. A pair of screens are placed between the filter and a radiation detector. One screen is arranged to pass alpha particles emitted by a first progeny, radium A, while blocking radiation emitted by other progenies. The second screen is arranged to pass alpha particles emitted by a second progeny, radium C', while similarly blocking radiation emitted by other progenies. The detector uses a film that is capable of recording tracks of alpha particles that pass through the two screens. The number or density of the tracks recorded over the two screened areas are then measured and the concentration of the A and C' progenies present in the atmosphere computed from these measurements.

A device for testing air filtration systems for removing radon progeny from an air flow is also disclosed is U.S. Pat. No. 3,614,421. This type of filtration system is intended to operate as a high efficiency device for capturing and retaining most, if not all the radon progeny found in a moving air stream. Radon progeny detectors are placed on the upstream and downstream side of the filter system which provides information concerning the concentration of radon progeny approaching and leaving the filter area. Each detector contains a capture chamber connected to a vacuum pump which draws a sample flow of atmosphere through the filter which captures the radon progeny. Alpha particles emitted by the trapped radon progeny are recorded as tracks in a cellulose based film. Valuable information concerning the effectiveness of the filtering system is thus gained by simply comparing the measured concentration of tracks recorded by the upstream detector with those recorded by the downstream detector.

Passive radon detectors operating on the same general principles as those described in the above noted patents, are also set fourth in the U.S. Pat. Nos. 4,704,537; 4,518,860; 4,385,236; and 3,665,194.

Although all the above noted detectors are fully capable of detecting and measuring levels of decaying by-products, such as radon, these devices are nevertheless not capable of distinguishing between the concentrations of unattached and attached fractions. Accordingly, the ratio of progeny present to radon gas (F) in a sample of air, as well as, the ratio of the unattached progeny to the total progeny (f) can only be inferred from average measurements. These inferred levels, for an average home, may vary significantly so that the risk factor is correspondingly either over or under estimated by a considerable amount.

The invention of this application is an improvement over the invention shown in our U.S. Pat. No. 4,847,503 filed April 22, 1988. In this earlier application the unattached fractions of radon progeny are plated out on the plates of a diffusion battery where one of the effective plates may be the track registration strip for recording the particle radiation emitted by the daughters of radon present in the test atmosphere.

While this device has proven to be an effective and economical device for measuring radon concentrations it has been found desirable to provide more sensitive devices capable of faster and more flexible counting of the particle radiation emitted by the daughters of radon in a given test atmosphere.

SUMMARY OF INVENTION

It is therefore an object of the present invention to provide an improved apparatus for detecting progeny of radon.

It is another object of the present invention to measure with greater sensitivity the presence of radon progeny in a test atmosphere.

It is a another object of the present invention to more efficiently detect and measure the adverse health effects from the alpha and beta particles radiated from daughters of radon.

It is a still further object of the present invention to provide a device to measure particle radiation from daughters of radon over a wide variety of time spans.

Another object of the present invention is to provide an economical method and device for interchangeably detecting and measuring the alpha and beta particle emissions of radon progeny within an atmosphere.

These and other further objects of the present invention are attained by a radon progeny detector having a particle trap, a detector screen, and a pump for drawing air through said trap and screen. A small pump is arranged to draw air into a closed chamber having a diffusion screen, a filter, and a radiation detection strip mounted adjacent said filter and on either side of said screen. The screen is chosen with a grid size large enough to pass the attached fractions to the filter and yet still attract and "plate out" the unattached fractions of the radon progeny. Radiation detection strips adjacent the filter and on either side of the screen "record" the tracks of the alpha and/or beta particles emitted from the fractions trapped by the filter and adhering to the mesh of the screen. Concentrations of each fraction are determined by counting the number of "tracks" made by the attached and unattached fractions on their respective track detection strips. The term "tracks" is used to denote any detectable change in a radiation detecting material such as "tracks" in film strips, and "light" in TLD strips.

BRIEF DESCRIPTION OF THE DRAWINGS

The invention will be described in detail with reference to the attached drawings in which.

DETAILED DESCRIPTION OF THE INVENTION

Figure 1:
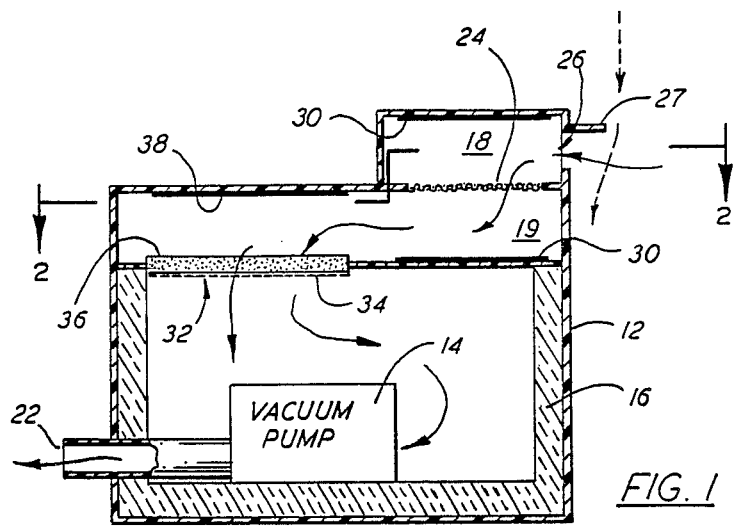
FIG. 1 is a side view partially broken away to show sectional details.
Figure 2:
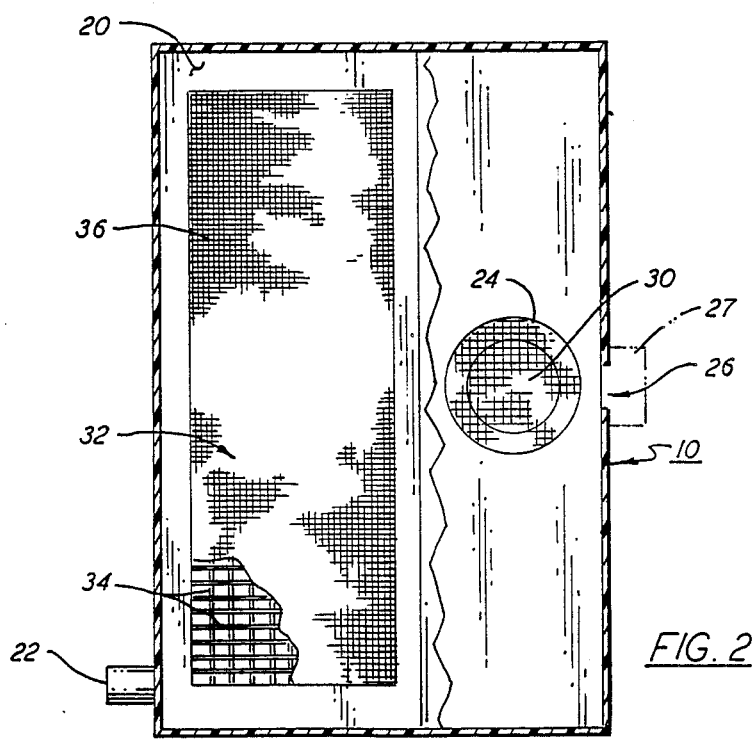
FIG. 2 is a top view partially broken away to show details of the screen and filter.

Referring now to FIG. 1 there is shown a radon progeny detector 10 having an outer shell 12 made of any suitable molded plastic, detection chambers 18, 19 and 20, a diaphragm pump shown diagrammatically at 14 in the lower portion of shell 12, a diffusion screen 24, and a filter assembly 32. Pump 14 is mounted in foam 16 or other suitable vibration damping materials and is preferably of a size to move approximately one liter of air per minute through the detector. Detection chambers 18, 19, and 20 are arranged in shell 12 so air drawn from outside by pump 14 will flow first through chamber 18 then 19 and finally chamber 20 and thence be discharged through port 22.

The volume of air that must be monitored is related to the areas of the progeny trapping screen and filter as well as the type of radiation detecting material being used and the velocity of the air passing through the various progeny trapping devices.

In general, the diffusion screen requires a higher velocity for the air passing through it to attract out the unattached progeny than does the filter to trap the attached progeny. The cross-sectional areas of the two can be adjusted to compensate for this.

Thus in one embodiment of our invention the diffusion screen is a circular area one-half inch in diameter and the air velocity through the screen in 10-20 cm/sec. The filter area is from 1 ½ to 2 ½ square inches and the velocity through the filter drops to 1-2 cm/sec. The specific ratios are chosen relative to the radiation material being used to ensure reaching statistically significant sample limits and saturation limits at each radiation detecting strip in the same amount of operating time.

The type of radiation detecting material and its sensitivity is chosen relative to the overall amount of time it is desired to monitor an atmosphere to maintain the materials within the desired limits.

A diffusion battery for diffusing out unattached radon progeny from an airstream as shown in the art, such as our copending application SUPRA, has a pair of elongated plates between which the air is passed. The track detecting strip is frequently also disposed between the plates in the airstream. In this configuration the progeny "plate out" very heavily near the entrance and much less toward the exit. In order to measure the unattached fraction a relatively large amount of track detecting strip must be examined. Also the rate at which the track density decreases is usually used to measure the diffusion coefficient of the unattached progeny.

In the present invention we have developed a screen type of diffusion battery which allows the diffusing out of radon progeny on the mesh material of the screen throughout the entire surface area of the screen. We have chosen to call this construction a "diffusion screen" since the end result is the diffusing out onto the screen of unattached radon progeny. The area of the screen is much smaller than the area of a parallel plate diffusion battery for similar air flow rates. Since the progeny is collected over a much smaller area lower concentration of progeny can still be readily detected, thus providing a more sensitive detection device. In addition significant levels of tracks can be obtained in a shorter length of time.

Mounted between chambers 18 and 19 is diffusion screen 24 positioned so the airstream from outside shell 12 will flow through chamber 18, screen 24, and chamber 19. Air is drawn in opening 26 and flows generally as shown by the arrows in FIG. 1 until discharged at 22. Also mounted in chambers 18 and 19 is a pair of radiation detecting strips 30, one on either side of diffusion screen 24.

After chambers 18 and 19 the air passes into chamber 20 which has mounted on the exit side thereof a filter assembly 32. This assembly 32 consists of a supporting frame 34 and filter material 36. Positioned on the opposite wall of chamber 20 is another track detection strip 38 composed of the desired material to record the tracks made by the alpha or beta particle radiations from the attached radon progeny captured on the filter material 36. Not shown are access doors that permit film strips 30 and 36 and filter 32 to be removed and replaced as required.

Opening 26 has a shield or shelf 27 mounted on the upper edge thereof. Shield 27 extends outwardly from the shell 12 a distance sufficient to prevent the larger attached particles generally 10 microns or larger from being drawn into chamber 18 as they drift downwardly under the influence of gravity and the suction of the airstream. Attached particles passing the opening 26 will be deflected toward the opening but will impinge on the shell 12 as shown by the dotted arrow in FIG. 1 rather than enter the airstream.

The mesh size of diffusion screen 24 is chosen to allow attached fractions of the radon progeny to flow through unobstructed for a given airstream velocity. Generally the higher the airstream velocity the smaller the mesh size. The attached particles generally have a size of 10 nanometers or larger and are drawn through screen 24 by pump 14 to filter assembly 32. Filter material 36 has very good retention efficiency for particles greater than 10 nm and will capture the attached progeny essentially uniformly across its entire surface area and hold them on the surface thereof in chamber 20. Conversely the unattached fractions are less than 10 nm. For an airstream velocity of 10-20 cm/sec screen 24 in one embodiment is an 80 grid mesh material, approximately on half inch in diameter with about one tenth the area of the filter material 36. Sufficient surface area must be provided to meet the run-time expectancy of the device, considering the minimum sensitivity requirements of the track detection material and the saturation limits of the material.

Track strips 30 are formed of radiation registration material suitable for the detection of alpha, beta, or other radiation from radon progeny. For alpha particles materials such as cellulose nitrate or allyldyglycol carbonate (CR-39) may be used. For beta particles and certain alpha particles materials such as thermoluminescence detectors (TLD) composed of crystalline materials like lithium fluoride are commonly used. Track detection material is generally energy dependent, i.e. particles of different energy levels will produce varying degrees of tracks in a particular material. Since radon alpha and beta progeny have different energies this must be taken into account when choosing the detection material and when interpreting the results. By choosing the appropriate track detection material different run-times may be achieved and also the same device can be used for alpha, beta, or other particle radiation detection.

By counting and comparing tracks on the different track detection strips 30 and strip 38 a more accurate total is derived and hence a more accurate percentage of the dangerous unattached progeny obtained.

In operation the device is connected to a source of power and placed in the space to be tested. Pump 14 is set to draw air through chambers 18, 19, and 20 such that the unattached particles will attach to diffusion screen 24 while the larger attached particles and their host dust particle will be carried through to the filter 32 where they will be removed and retained. Track detection strips 30 are positioned on either side of screen 24 in close proximity so that substantially all the alpha and/or beta particles emitted from the unattached radon progeny on screen 24 will be recorded by their tracks on the strips. With the screen 24 collecting the unattached fractions essentially uniformly throughout its entire area the alpha/beta particles have unobstructed passage to one of the pair of track strips 30 but not both. Thus all tracks are counted and added together to determine the exposure level.

While the present invention has been described with specific reference to the structure disclosed herein, it is not confined to the details set forth and this application is intended to cover any modifications or changes as may come within the scope of the following claims.

What is claimed is

1. A radon progeny detector comprising first and second detection chambers connected together for smooth flow of an airstream therethrough, pump means for drawing a predetermined airstream through said first and second chambers, a diffusion screen mounted in said first chamber in the airstream so that the unattached radon progeny in the airstream diffuse onto the screen member, first radiation detecting means mounted on both sides of said diffusion screen in said first chamber, particle trapping means mounted in said second chamber to trap out attached radon progeny from said airstream, and second radiation detecting means mounted adjacent said particle trapping means, such that radiation from radon progeny captured by said screen member and said particle trapping means will impinge on said first and second radiation detecting means respectively.

2. The detector of claim 1 wherein said diffusion screen is a screen having a mesh size large enough to pass the attached fractions of radon progeny but small enough to capture a significant percentage of unattached radon progeny relative to the airsteam velocity.

3. The detector of claim 1 wherein said diffusion screen is plastic screen material having an 80 grid mesh, and said pump means provides an airstream velocity of 10–20 cm/sec.

4. The detector of claim 1 wherein said radiation detecting means is a material from the group of cellulose nitrate, polycarbonate, and thermoluminescence detecting materials such as lithium fluoride.

5. The detector of claim 1 wherein said particle trapping means for capturing attached radon progeny is a filter assembly comprising a supporting grid and a filter material having a retention efficiency of greater than 95 percent for attached progeny.

6. The method of detecting attached and unattached radon progeny in an airstream comprising the steps of;
passing an airstream through a diffusion screen,
diffusing out from the airstream the unattached radon progeny across the entire surface of the diffusion screen,
passing said airstream through a filter,
trapping out the attached progeny from the airstream on said filter,
surrounding the surface area of said diffusion screen with radiation detecting material,
detecting the particle radiation emitted from the diffused out unattached radon progeny,
placing radiation detecting material adjacent said filter, and
detecting the particle radiation emitted from said trapped out attached radon progeny.

7. The method of claim 6 wherein detection is done by the creation of tracks in the detecting material in that further includes counting the total radiation particle tracks made by the diffused out unattached radon particles,
counting the total radiation particles tracks made by the trapped out attached progeny, and
determining the total and percentage proportions of each type of particle radiation whereby the health risks associated with said airstream can be accurately assessed.

8. The method of claim 6 that further includes limiting the diffusion screen area to a small percentage of the area of the filter, so as to balance the effective sensitivity of the radiation detecting material over the operating range.

9. The method of claim 6 that further includes selectively choosing the radiation detecting material for said screen and filter from either alpha or beta particle emission detecting material to detect one particular type of radiation.

10. The method of claim 6 further characterized by selecting the area of said diffusion screen, and said filter so that each reaches the statistically significant sample limit and the saturation limit at approximately the same amount of operating time.

11. The method of claim 6 further including selecting the radiation detecting material for said diffusion screen and said filter with a sensitivity proportional to the desired run time of said method of detecting attached and unattached radon progeny.

12. The method of claim 6 further characterized by shielding said airstream intake to prevent entraining attached progeny larger than 10 microns.

13. The method of claim 6 that further includes passing the airstream through the diffusion screen at a high rate of velocity and through the filter at a low rate of velocity.

14. The method of claim 13 further characterized by the rate of velocity of the airstream through the diffusion screen being about ten times the velocity through the filter.

* * * * *